Sept. 7, 1954
J. MÜLLER
2,688,260
GEAR FOR CONVERTING ROTARY MOTION
INTO LONGITUDINAL MOTION
Filed Feb. 9, 1952
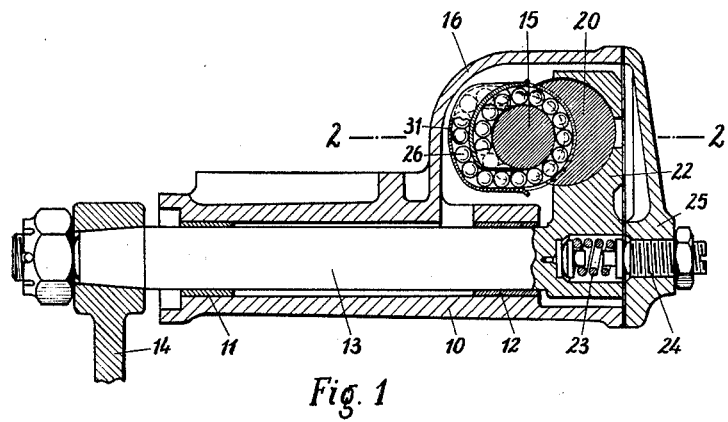
Fig. 1
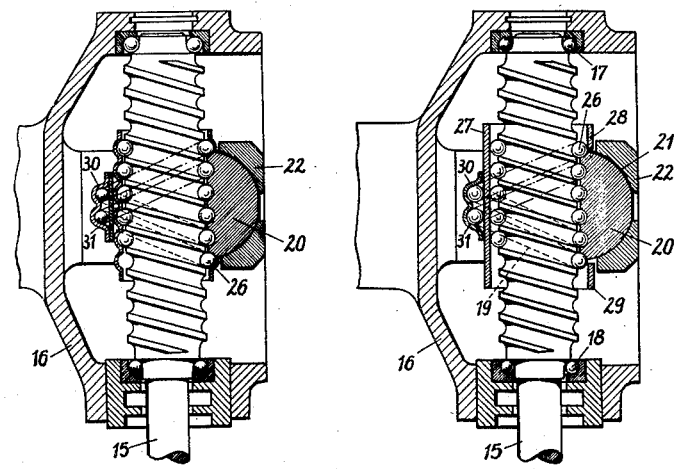
Fig. 3
Fig. 2
Josef Müller
By Dicke and Padlon
ATTORNEYS Patented Sept. 7, 1954

2,688,260

UNITED STATES PATENT OFFICE 2,688,260

GEAR FOR CONVERTING ROTARY MOTION INTO LONGITUDINAL MOTION

Josef Müller, Stuttgart, Germany, assignor to Daimler-Benz Aktiengesellschaft, Stuttgart-Unterturkheim, Germany Application February 9, 1952, Serial No. 270,816

Claims priority, application Germany February 10, 1951

10 Claims. (Cl. 74—499)

This invention relates to a gear for converting a rotary motion into a longitudinal motion. More particularly the invention concerns a steering device having a threaded shaft and a threaded sector in the form of a nut which, for example, is spring urged into engagement with said threaded shaft and spherically supported in a part that can be swung as, for example, the steering arm.

It is an object of the invention to provide a gear of the character mentioned that is adapted to attain by simple means an almost friction-less and kinematically unobjectionable engagement of shaft and sector.

Another object of the invention is to provide a gear of the character mentioned that is particularly advantageously arranged with regard to saving of space.

A still further object of the invention is to provide a gear of the character mentioned that is simple in design and inexpensive to manufacture.

An important feature of the invention consists essentially therein that the threaded engagement of shaft and sector is effected by a ball chain running in the thread. Along with this the sector is integrated, on that particular part of the shaft which is not surrounded by it, by means of a guide sleeve which surrounds the balls and thereby secures them against falling out of the thread.

According to another feature of the invention the guide sleeve is formed as a smooth sleeve, and with its smooth inner face it is in working contact with the balls. Most desirably, the guide sleeve is secured by the sector as well in axial as also in circumferential direction. According to another feature of the invention the return of the balls is effected on the outside of the guide sleeve, for example, through a curved half pipe mounted on the sleeve and extending into the thread.

Further features of the invention deal with the employment of two or more ball chains of which each one is closed in itself, and along with this, provision may be made for integrally formed return pipes for both ball chains.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Fig. 1 is a sectional view through the steering gear taken in the plane through the axis of the steering arm shaft, Fig. 2 is a horizontal sectional view taken in the plane 2—2 in Fig. 1, and Fig. 3 shows another form of the guide sleeve.

Mounted on bearings 11, 12 in the housing 10 of the steering gear is the steering arm shaft 13 on the outer end of which is mounted the arm 14 for turning the dirigible road wheels by means of the steering linkage. The steering arm shaft 13 is transverse to the steering shaft 15 which is operable by the steering wheel and rotatably supported in the housing section 16 in thrust bearings 17 and 18. The portion of the steering shaft 15 located between these two thrust bearings is provided with threads 19. Provided with corresponding threads is the sector nut 20 which is of spherical shape on its outside and supported in a correspondingly formed spherical cavity in the steering arm 22. A spring 23, the tension of which is adjustable by a setting screw 24, arranged in the housing cover 25, forces the steering arm shaft 13 and the steering arm 22 toward the left so that the sector 20 is pressed toward the steering shaft 15. Interposed between the threads of the sector 20 and the threads of the shaft 15 are balls 26 which effect the threaded engagement of shaft and sector with one another. In order to prevent the balls, after they leave the sector, from falling out of the threads, a cylindrical guide sleeve 27 is slid on the steering shaft 15. This sleeve is so formed that its inside diameter just touches the outside of the balls 26 running in the threads 19. If necessary, the guide sleeve may be provided with a finish ground interior face. The guide sleeve 27 is notched to fit over the sector 20 so that it may be axially supported thereon at 28 and 29 and at the same time perpendicular thereto in circumferential direction on its edge which surrounds the sector.

The steering shaft is formed as a double-threaded shaft; engagement with each of the two threads being effected by a separate ball chain (closed in itself) or by a circuit of balls. In order to prevent the balls from leaving the sleeve 27 in axial direction, half pipes 30 and 31, integrally shaped from a sheet-metal blank, are mounted on the outside of the sleeve 27. The ends of the pipes are passed through holes in the sleeve 27 and extend up to the surface of the steering shaft, so as to return the balls, as the shaft is rotated, from the one to the other end of the ball chain. It should be noted at this point that the spring pressure ensuring the engagement of the steering shaft with the sector is taken up by the balls with a minimum of friction.

Instead of a smooth cylindrical guide sleeve 27 there might be provided a sleeve 27' with, for example, stamped flutes 27'' for the balls 26, as clearly shown by way of example in Fig. 3.

In place of a guide sleeve made of sheet metal there might be used a part that is differently made or formed and extends the ball path beyond the sector.

What is claimed is:

1. A gear for converting a rotary motion into a longitudinal motion comprising, a relatively fixed part, a shaft, bearing means for supporting said shaft in said relatively fixed part in such a manner that said shaft is rotatably supported in said fixed part yet axially secured against thrust, threads on said shaft formed in such a manner that balls may run therein, a sector in the form of a nut partially surrounding said shaft, threads in said sector complementary to the threads on said shaft, the back of said sector having a spherical shape, a member having a spherical cavity formed to correspond to and for receiving the spherical part of said sector, said member being arranged in such a manner that it can be swung about an axis positioned transverse to said shaft, a ball chain the balls of which run in the threads on said shaft and in said sector, a sleeve surrounding said shaft and having a notch into which said sector projects, said sleeve having such an inside diameter that it is in working contact with the outside of the balls running in the threads on said shaft in such a manner that the balls after leaving the threads in said sector bear against said sleeve.

2. A gear according to claim 1 including, a pipe member mounted on the outside of said sleeve for connecting two points axially spaced apart on the threads in said shaft and adapted to return the balls running in the threads in an endless circuit from the one to the other of said two points.

3. A gear according to claim 1, wherein said shaft and said sector are each provided with two threads each of which are in threaded engagement with another, and further comprising two trains of balls in said threads so that one of each is in each of said threads, means on the outside of said sleeve for connecting two points axially spaced apart on said two threads and adapted to serve as return pipes for said two ball trains so that they form endless ball trains.

4. A gear according to claim 1, wherein the inside of said sleeve forming the bearing surface for said balls is of cylindrical shape.

5. A gear according to claim 1, wherein the inside of said sleeve is provided with threads corresponding to the threads in said sector.

6. A gear according to claim 1, wherein the notch in said sleeve closely surrounds said sector so that a continuous surface is formed for the control of the balls.

7. A gear according to claim 1, wherein said sleeve is supported on said sector as well axially as also in circumferential direction of said shaft.

8. A gear according to claim 1 including, resilient means for holding the spherical cavity in said swingable member and the spherical part of said sector in engagement with each other.

9. A steering device comprising, a steering-gear housing, a steering-gear shaft, bearing means for supporting said steering-gear shaft in said steering-gear housing in such a manner that said steering-gear shaft is rotatably supported in said steering-gear housing yet axially secured against thrust, threads on said steering-gear shaft formed in such a manner that balls may run therein, a sector in the form of a nut partially surrounding said steering-gear shaft, threads in said sector complementary to the threads on said steering-gear shaft, the back of said sector having a spherical shape, a steering arm shaft rotatably mounted in bearings in said steering-gear housing and transverse to said steering-gear shaft, a steering arm on said steering arm shaft, said steering arm having a spherical cavity formed to correspond to and for receiving the spherical part of said sector and so arranged that it can be swung about the axis thereof, a ball chain the balls of which run in the threads in said steering-gear shaft and said sector, a sleeve surrounding said steering-gear shaft and having a notch into which said sector projects, said sleeve having such an inside diameter that it is in working contact with the outside of the balls running in the threads on said steering-gear shaft in such a manner that the balls after leaving the threads in said sector bear against said sleeve, a pipe member mounted on the outside of said sleeve for connecting two points axially spaced apart on the threads in said steering-gear shaft and adapted to return the balls running in the threads in an endless circuit from the one to the other of said two points.

10. A gear for converting a rotary motion into a longitudinal motion comprising, a relatively fixed part, a shaft, bearing means for supporting said shaft in said relatively fixed part in such a manner that said shaft is rotatably supported in said fixed part yet axially secured against thrust, threads on said shaft formed in such a manner that balls may run therein, a sector in the form of a nut partially surrounding said shaft, threads in said sector complementary to the threads on said shaft, a ball chain the balls of which run in the threads on said shaft and in said sector, resilient means by which the balls are pressed by means of said sector against said shaft, a sleeve surrounding said shaft and having a notch into which said sector projects, said sleeve having such an inside diameter that it is in working contact with the outside of the balls running in the threads in said shaft in a manner whereby the balls after leaving the threads in said sector bear against said sleeve.

References Cited in the file of this patent

UNITED STATES PATENTS

| Number | Name | Date |
|---|---|---|
| 1,343,846 | Rapson | June 15, 1920 |
| 2,019,927 | Porsche | Nov. 5, 1935 |
| 2,327,013 | Briggs et al | Aug. 17, 1943 |

FOREIGN PATENTS

| Number | Country | Date |
|---|---|---|
| 524,608 | Great Britain | Aug. 9, 1940 |
| 357,870 | Italy | Mar. 29, 1938 |